(12) United States Patent
Li et al.

(10) Patent No.: US 7,272,246 B2
(45) Date of Patent: Sep. 18, 2007

(54) PERSONAL IDENTIFICATION METHOD AND APPARATUS

(75) Inventors: Dongge Li, Palatine, IL (US); Bhavan Gandhi, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 725 days.

(21) Appl. No.: 10/443,637

(22) Filed: May 22, 2003

(65) Prior Publication Data

US 2004/0234108 A1 Nov. 25, 2004

(51) Int. Cl.
*G06K 9/00* (2006.01)
(52) U.S. Cl. ............... 382/116; 382/115; 382/118; 340/5.53; 340/5.83
(58) Field of Classification Search ........... 382/116, 382/115, 117, 118; 340/5.53, 5.83
See application file for complete search history.

(56) References Cited

U.S. PATENT DOCUMENTS

| | | | |
|---|---|---|---|
| 5,095,196 A * | 3/1992 | Miyata | 235/382 |
| 5,229,764 A | 7/1993 | Matchett | |
| 6,205,233 B1 * | 3/2001 | Morley et al. | 382/103 |
| 6,418,235 B1 * | 7/2002 | Morimoto et al. | 382/118 |
| 6,795,808 B1 * | 9/2004 | Strubbe et al. | 704/275 |
| 6,947,578 B2 * | 9/2005 | Lee | 382/116 |
| 2006/0110014 A1 * | 5/2006 | Philomin et al. | 382/118 |

OTHER PUBLICATIONS

Cheng et al. "Learning Bayesian Belief Network Classifiers: Algorithms and System", Lecture Notes in Computer Science, 2001.*
Bigun et al.; "Expert conciliation for multi modal person authentication systems for Bayesian statistics", First International Conference on Audio- and Video- based Biometric Person Authentication, Mar. 12-14, 1997.*
Nefian; "Embedded Bayesian Networks for Face Recognition", IEEE ICME '02, 2002.*

* cited by examiner

*Primary Examiner*—Bhavesh M Mehta
*Assistant Examiner*—John B Strege

(57) ABSTRACT

A processor (10) utilizes information regarding one or more physical dimensions of an individual (14) to better inform a personal identification process. In one embodiment, the measured physical dimensions are utilized to influence the conduct of a face recognition process. In one embodiment, a Bayesian Belief Network can be utilized to facilitate such processes.

18 Claims, 3 Drawing Sheets

PERSONAL IDENTIFICATION METHOD AND APPARATUS

TECHNICAL FIELD

This invention relates generally to identification of a particular individual and more particularly to face recognition.

BACKGROUND

Positive personal identification comprises a long-standing area of endeavor. For example, as part of completing numerous official transactions, an individual may be required to produce an item of personal identification such as a government or enterprise-issued card or badge that includes information about the individual (such as their name) and/or their likeness. Such actions often unfortunately add both time and corresponding activities to the transaction itself, thereby increasing the need for the resources (and often, particularly, human resources) that are required to effect the identification process while also often introducing delay and inconvenience for the individual or individuals who are being identified.

Notwithstanding such inconvenience, costs, and required logistical support, the underlying purpose of such identification remains important. In fact, a general trend seems to be an overall increase in the desire to expand the number of instances when personal identification may be appropriate and/or to increase the depth and quality of personal identification activities when and as they are conducted.

Numerous mechanisms and attributes are known to facilitate identifying a given individual as being a particular known person. Fingerprints (and other external asperity pattern-based indicia), retinal and/or iris patterns, gait analysis, voice recognition, DNA records and other biological/physical indicia have all been proposed for such purposes along with many other biometrics. Depending upon the context, many of these approaches serve well to permit accurate identification of a given individual.

There are some settings, however, and/or some circumstances, when personal identification based upon such methods are less satisfactory as such techniques are either simply not available or are ineffective for one reason or another. In general, such techniques, including face recognition systems often only perform acceptably in relatively restricted application domains. As but one simple example to illustrate this point, numerous individuals must be quickly processed through security areas of an airport. Typical prior art techniques such as those noted above either tend to be unduly burdensome (with respect to cost and/or application) and/or are unduly subject to fraudulent avoidance and/or are just otherwise unreliable. As a result, for example, a known fugitive can potentially, with relative ease, present themselves as being a person of a different identity and avoid being correlated with their true identity.

BRIEF DESCRIPTION OF THE DRAWINGS

The above needs are at least partially met through provision of the identification method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a human face is detected and also at least one other physical dimension that corresponds to the body of the person having the face is detected. A personal identification process is then conducted as a function, at least in part, of the human face and at least one other physical dimension.

The at least one other physical dimension that corresponds to the body can comprise any of a wide variety of such dimensions, including but not limited to weight, overall height, torso width, length of a given appendage, the presence or absence of specific topical attributes (such as, but not limited to, so-called birthmarks, tattoos, scars, and discolorations or colorations of various kinds), stride and/or gait mechanics, reflectivity/light absorption characteristics, and color (including hair color, skin color, and attire color, for example), to name but a few illustrative examples. In a preferred embodiment, where heightened accuracy and/or possibly speed of processing exists, at least two such physical dimensions (such as height and weight) are used to facilitate the personal identification process.

In some embodiments, detection of a given physical dimension can be used to trigger (or hold in abeyance) other aspects of the corresponding process, including face detection and/or facial recognition actions. By conditioning such computationally-intensive activities upon a relevant opportunity, related resources can be appropriately rationed and/or preserved or otherwise assigned without substantially compromising the identification process.

In some embodiments, a Bayesian Belief Network can be employed to fuse and correlate in desired ways a face recognition process with probabilities as correlate to the one or more detected physical dimensions. Various benefits can flow from such an approach, including a potential decrease in overall processing requirements with an attendant increase in the desired likelihood of identifying a given known individual.

Figure 1:
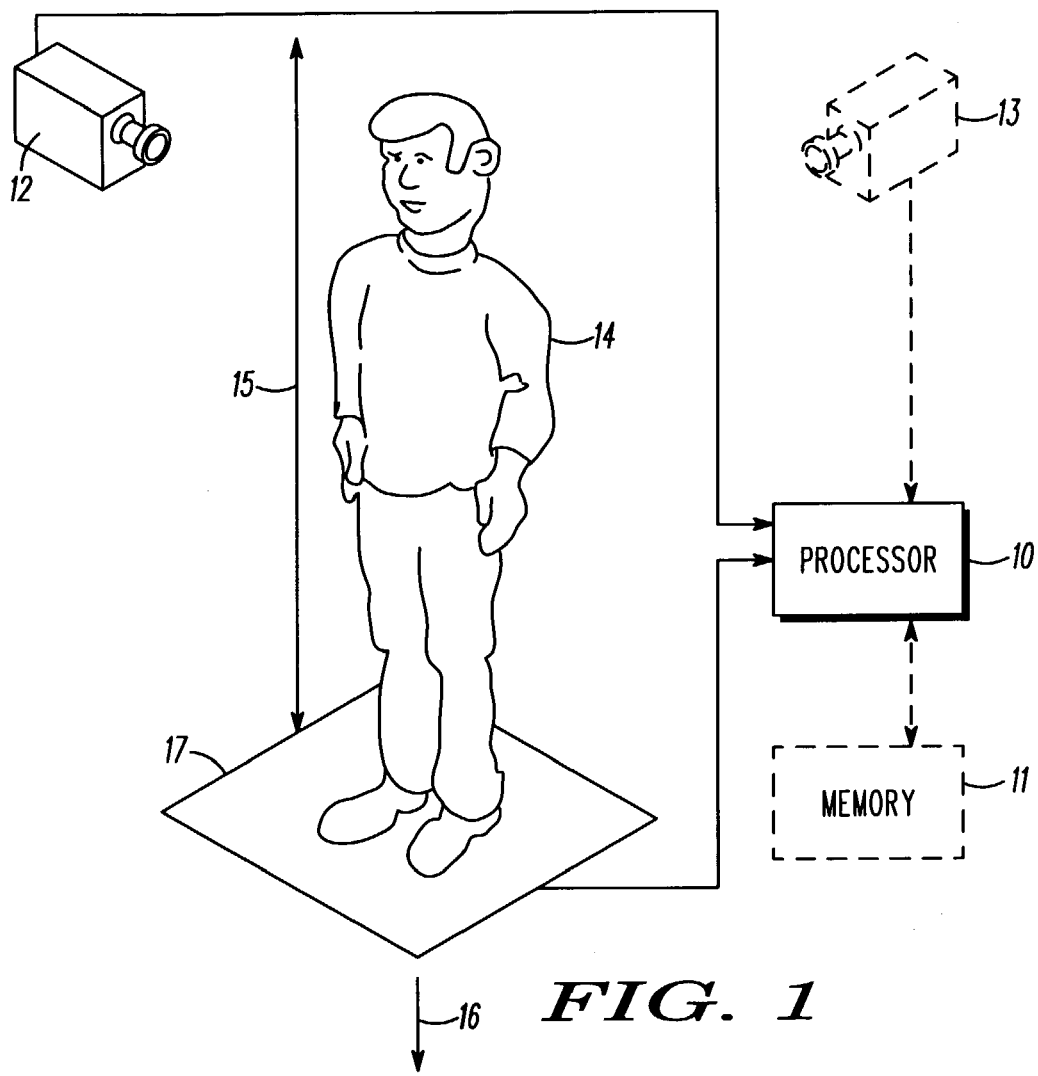
FIG. 1 comprises a block diagram as configured in accordance with an embodiment of the invention.

Referring now to the drawings, and in particular to FIG. 1, a processing platform of choice serves to facilitate many of the various actions described herein. This processor 10 can comprise an integrated platform or can be distributed over a plurality of physically separated processing mechanisms, with both architectural approaches being generally well understood in the art. If desired, the processor 10 can comprise, in whole or in part, a dedicated platform com prised of essentially hard-wired processes and responses. In a preferred embodiment, however, the processor 10 comprises a programmable platform and may include one or more microprocessors, microcontrollers, digital signal processors, and the like.

The processor 10 may have sufficient native memory to facilitate its various actions and/or it may be optionally operably coupled to additional memory 11. Such additional memory 11 can retain additional programming for the processor 10 and/or can retain, for example, data used by the processor 10 (such as, but not limited to, pattern information that corresponds to the appearance of one or more individuals of interest). As appropriate to a given application, this additional memory 11 can be physically co-located with the processor 10 and/or can be physically disposed remotely therefrom.

In a preferred embodiment, the processor 10 couples to at least one image capture device 12, such as, for example, a digital camera. The image capture device 12 can be either a still image capture device or a video image capture device. For some applications, it may be desired to have more than one such device. For example, it may be appropriate to have a second image capture device 13, which second device may be positioned proximal to the first image capture device 12 (to serve, for example, as a redundant back-up device for the first device) or may be positioned distal to the first image capture device 12 (to serve the purpose, for example, of capturing an image of a subject from an alternative angle or with a different field of view).

The image capture device(s) in a preferred embodiment operate under the control of the processor 10 but may, if desired, provide a constant stream of capture image information in an open-loop fashion or in response to an alternative control mechanism (not shown) such as an independent trigger device. If desired, the image capture device(s) may be remotely controllable such that the device can be aimed in a preferred direction in a controlled fashion and/or to permit zoom capabilities or other selectable features (such as exposure or contrast) to be used in response to remote signaling (from, for example, the processor 10).

In general, the image capture devices are positioned and configured to permit capturing images of a person 14 (either images featuring the entire person or pertinent portions thereof). In particular, at least one of the image capture devices is preferably oriented to permit capturing images of the person's face (such an image can be a full front view, a full profile view, a perspective view, and so forth as desired). Such facial images are usable by the processor 10 to facilitate a facial recognition process (or processes) as noted below in more detail.

A preferred embodiment also includes at least one physical dimension measurement device. In the embodiment depicted, two such physical dimensions are monitored; an external body linear measurement comprising the overall height 15 of the person 14 and the overall weight 16 of the person 14. One or more of the image capture devices can also serve, in this embodiment, as the physical dimension measurement device to monitor and permit detection of the overall height 15 physical dimension. That is, an overall image of the person 14 as captured by one of the image capture devices can be used, in a calibrated setting, to at least estimate and in many settings to determine with relative precision the overall height of the person 14. A weight sensor 17 as operably coupled to the processor 10 can serve to provide information regarding the overall weight 16 physical dimension. So configured, the processor 10 receives data regarding a first and a second physical dimension that both correspond to the individual 14 and also potentially receives facial image details that can be used for facial recognition activity.

It should also be noted that, if desired, a weight sensor can be used in conjunction with a single image capture device to nevertheless provide an accurate measurement of both the subject's height and weight (in general, multiple image capture devices are used pursuant to prior art techniques when seeking to ascertain height except in carefully constructed viewing settings). By using an image of a subject that is captured at a moment when the subject is also sensed by a given weight sensor, the distance between the subject and the image capture device is known with great accuracy and hence the height of the subject can be relatively easily and accurately determined as well.

It should be clearly understood that the above-described embodiments are intended to be illustrative only. In fact, numerous other configurations and/or components will readily serve to realize these same teachings and numerous other physical dimensions can be monitored, detected, and measured, either instead of the two physical dimensions that are mentioned above or in addition thereto. For example, an individual's weight pattern can be monitored and measured. When a subject passes through a monitored checkpoint, a weighting sensor can serve to extract several weight-related features, including onset time, offset time, peak value, bottom value, mean value, and variance (the onset time and the offset time reflect the time when the subject starts to enter or leave the checkpoint, the peak value and bottom value provides a conservative range of the subjects' weight, and the mean value provides a more accurate estimation of the subjects' weight). Such weight-related features can then be used in a comparison exercise to determine whether a particular subject's features tend to match the previously identified characteristic features for other individuals of interest.

Figure 2:
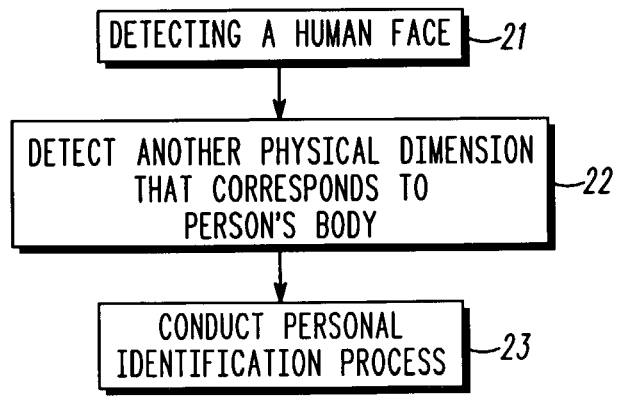
FIG. 2 comprises a flow diagram as configured in accordance with an embodiment of the invention.

So configured, the described configuration can readily support the various processes set forth herein. In general, and referring now to FIG. 2, such a configuration will readily permit detection 21 of a human face and detection 22 of at least one other physical dimension that corresponds to a person's body. Such information is then usable to conduct 23 a corresponding personal identification process. In a preferred embodiment, this personal identification process is conducted as a function, at least in part, of the captured human face and the at least one other physical dimension. For example, in one embodiment, the supported process can determine when a given captured human face likely comprises a particular predetermined human face as a function, at least in part, of the at least one other physical dimension.

Figure 3:
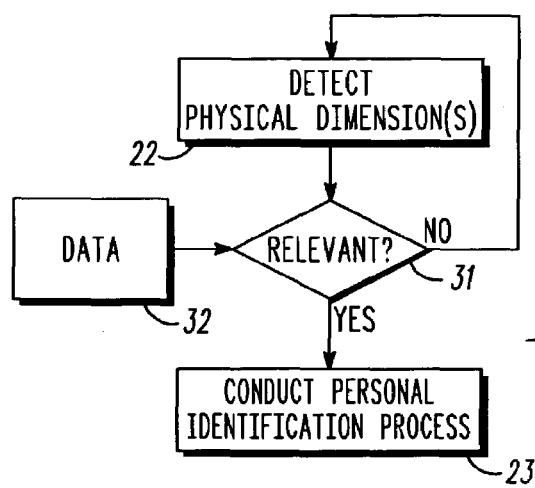
FIG. 3 comprises a flow diagram as configured in accordance with another embodiment of the invention.

Pursuant to one embodiment, and referring now to FIG. 3, conducting the personal identification process can be made contingent upon confirming that a particular physical dimension is sufficiently relevant to warrant the remaining process. That is, upon detecting 22 the one or more physical dimensions, the processor 10 can determine 31 whether the resultant measurements are relevant. For example, the measured physical dimensions can be compared against a pre-existing store of data 32 (as stored, for example, in the memory 11 noted earlier) to assess such relevancy. When the measured physical dimensions do not appear to correlate to a given individual of interest, the process can simply continue to detect additional physical dimensions (for other individuals, for example) rather than commit the full resources of the personal identification process. When, however, the measured physical dimension does correlate to an individual of interest, the personal identification process can be more fully conducted 23.

As an illustration, system operators may be searching for a given child who is known to be 4 feet tall and weighs 75 pounds. The physical dimension measurement devices described illustratively above can be used for each individual in, say, an airport queue, to obtain overall height and weight information. That information can then be automatically compared by the processor 10 with the data 32 containing the height and weight information for the child being sought. When an adult is present who measures 6 feet in height and weighs 175 pounds, this process will permit the processor 10 to avoid conducting a face detection and/or recognition process as the individual in question is determined to be an unlikely candidate based upon the measured physical dimensions.

Figure 4:
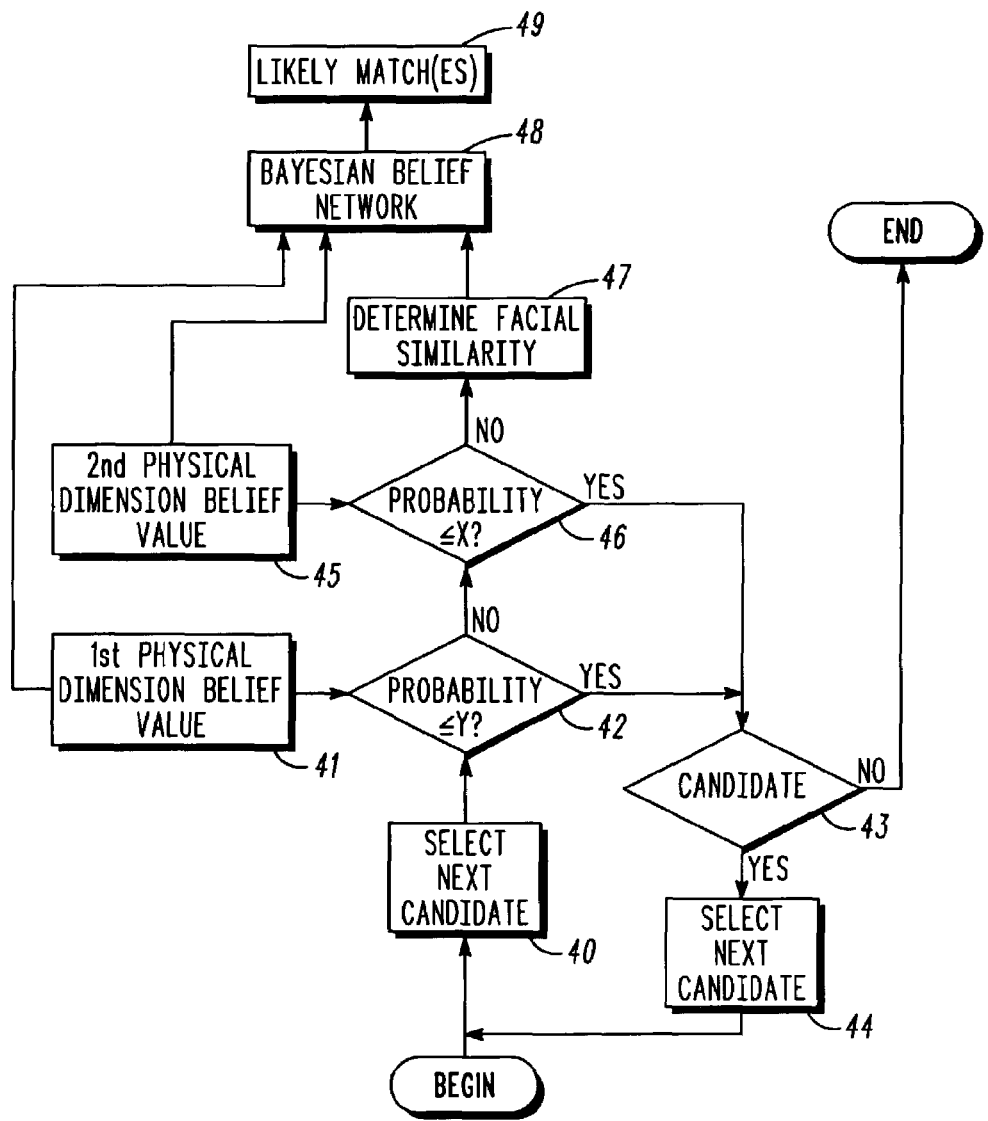
FIG. 4 comprises a flow diagram as configured in accordance with yet another embodiment of the invention.

In a preferred embodiment the processor 10 can facilitate a Bayesian Belief Network to process such information. FIG. 4 illustrates such an approach. Upon obtaining the information regarding a given individual 14 as suggested above the processor 10 selects a suspect search candidate 40. When there are a number of such candidates (as can occur when a given system operator is seeking to identify a number of fugitives and/or missing persons), this will typically mean selecting a first such candidate from the available pool. The processor 10 then determines 42 whether there is a reasonable probability or likelihood 41 that the measured physical dimension information for a first measured physical dimension (such as overall height of the person) matches the same measurement as corresponds to the selected search candidate.

When this probability is too low (for example, when the probability is less than a probably Y as selected and determined by a given system operator), the processor 10 then determines 43 whether any additional search candidates exist. If not, the process can conclude and await information as corresponds to a next measured individual. If additional search candidates yet remain, however, the processor 10 selects 44 a next candidate and the process continues as already described.

When the probability that the first measured physical dimension accords with the selected search candidate exceeds the probability threshold Y, however, the processor 10 next repeats this process with a second physical dimension (such as, for example, the weight of the individual). That is, the processor 10 determines 46 whether the probability 45 that the measured second physical dimension accords with the corresponding physical dimension of the search candidate. Again, when the probability is too low, the processor 10 can terminate the personal identification process for this particular search candidate and continue with a next search candidate.

Note that this determination regarding sufficiency of the probability can use a threshold X that is identical to the threshold Y used for the previous physical dimension, or can be different as appropriate to a given application. Also if desired, these thresholds can be dynamic and respond, for example, to uncertainties regarding the exact physical dimensions of a given search candidate. For example, the height of a given search candidate may be known with considerable accuracy, but for whatever reason the likely present weight of this candidate may only be suspected to be within a particular range of weights (such as, to illustrate, 180 to 210 pounds).

When a sufficient probability exists that the measured physical dimensions of a given individual correspond to the provided information for a given search candidate, the processor 10 determines 47 a probability that the face of the given individual matches that of the given search candidate. (There are numerous known ways by which such matching can be effected. Therefore, for the sake of brevity and the preservation of focus, additional details regarding such options will not be provided here.)

A Bayesian Belief Network 48 as is otherwise well understood in the art then processes this information (including, in a preferred embodiment, the probability information for the face recognition process as well as the probability information for each of the measured physical dimensions) to provide a resultant likely match or matches. As is well understood in the art, Bayesian Belief Networks are well suited to represent and otherwise deal with various kinds of uncertainty regarding one's knowledge in a given setting or context. Again, as before, such networks are well understood in the art and therefore in-depth detail will not be presented here regarding such networks for the sake of brevity.

Figure 5:
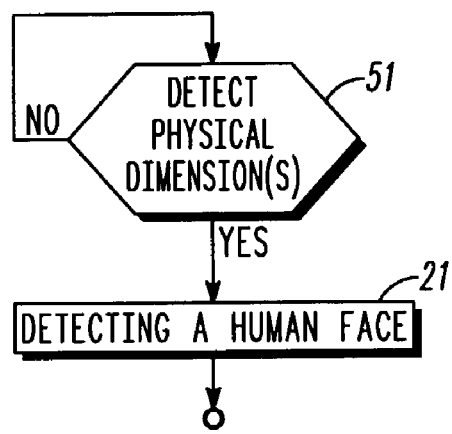
FIG. 5 comprises a flow diagram as configured in accordance with yet another embodiment of the invention.

In the embodiments presented above, the various parameters of interest are generally described as being captured more or less in parallel with one another. Processing of such information then optionally proceeds in a fashion that may or may not permit the identification process to be prematurely concluded as based upon the results of one or more of the measured physical dimensions. If desired, such embodiments can be altered to permit one or more of the information capture processes to be dependent upon a preceding information capture process and the results thereof. For example, with reference to FIG. 5, the processor 10 can continually monitor and detect 51 the presence or absence of one or more physical dimensions. Only upon detecting a physical dimension that exceeds, for example, some predetermined presence threshold, will the processor 10 then seek to detect 21 a human face. Such an embodiment can provide benefits even when the image capture device or devices operate in a substantially constant mode, as this approach will permit the processor 10 to avoid consuming processing resources to attempt to detect a human face in the incoming image stream when, for example, there is no individual in the image or when the individual in the image is clearly not an individual that likely matches any search candidate.

So configured, these various embodiments permit automatic detection of a human face (as located within, for example, an image of a person) along with automatic detection of at least one other physical dimension that corresponds to the body of the person having the detected human face. These various embodiments then permit automatically conducting face recognition of the human face as a function, at least in part, of the at least one other physical dimension.

It should be appreciated that these various embodiments yield a suspect detection security system that integrates a face recognition approach with additional physical features as collected at security checkpoints. With the use of such additional physical features, many suspect candidates to be searched can be eliminated and thus the system can avoid much or most of the traditional time-consuming face matching process. Further, these embodiments can be used in a variety of security applications, including but not limited to airport security, banks systems, casino security, government and enterprise facility security, and so forth. Furthermore, improved speed of performance and resultant accuracy, fewer false alarms, and higher precision can be achieved, in part, when a greatly reduced search list can be provided as described herein.

Figure 6:
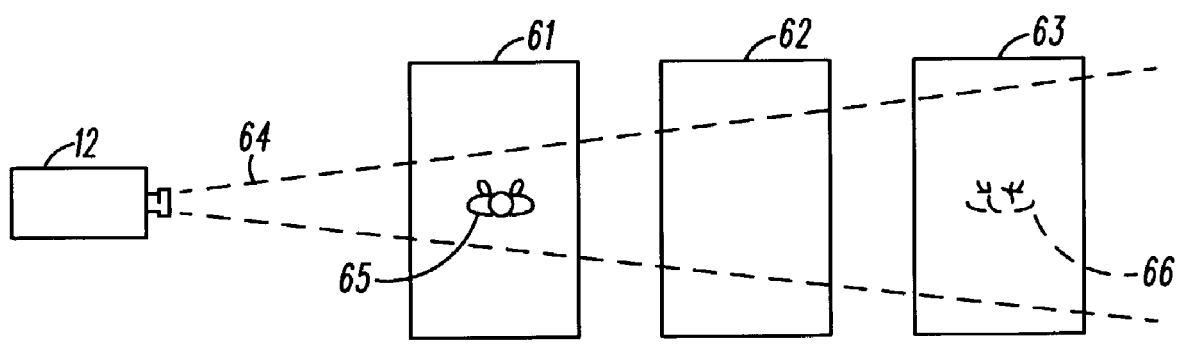
FIG. 6 comprises a top plan block diagram as configured in accordance with an embodiment of the invention.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, with reference to FIG. 6, a single image capture device 12 may be positioned to be able to capture images of individuals who are occupying any of a plurality of areas. For example, in the illustration provided, there are three such areas 61, 62, and 63. The field of view 64 of the image capture device 12 is such that a suitable image of a person 65 occupying the first area 61 can be captured by the image capture device 12. Similarly, the field of view 64 is also such that a person (not shown) occupying the second area 62 or a person 66 occupying the third area 63 can also be captured by the same image capture device 12. So configured, a single image capture device can adequately serve to capture images for the purposes described above of individuals occupying any of a plurality of processing locations.

We claim:

1. A method comprising:
detecting a human face;
using only a single image capture device, capturing an image of the body at a moment that is substantially coincident with detection of the person's weight;
using the image to determine the person's height;
determining whether to conduct a personal identification process that comprises, at least in part, identification of the human face, by determining, at least in part, whether at least one of the person's weight and the person's height are sufficiently relevant to warrant conducting the personal identification process; and
in response to determining to conduct the personal identification process, conducting the personal identification process as a function, at least in part, of the human face, the person's weight, and the person's height.

2. The method of claim 1 wherein detecting a human face includes not detecting a human face until determining the weight measurement.

3. The method of claim 2 wherein detecting a human face includes not detecting a human face until determining the weight measurement comprises determining that the weight measurement at least exceeds a predetermined trigger threshold.

4. The method of claim 1 wherein conducting a personal identification process as a function, at least in part, of the human face, the person's weight, and the person's height includes determining not to conduct automatic face recognition of the human face as a function, at least in part, of at least one of the person's weight and the person's height.

5. The method of claim 1 wherein conducting a personal identification process as a function, at least in part, of the human face, the person's weight, and the person's height includes determining to conduct automatic face recognition of the human face as a function, at least in part, of at least one of the person's weight and the person's height.

6. The method of claim 1 wherein conducting a personal identification process as a function, at least in part, of the human face, the person's weight, and the person's height includes determining when the human face likely comprises a particular predetermined human face as a function, at least in part, of at least one of the person's weight and the person's height.

7. A method comprising:
detecting a human face;
detecting at least one other physical dimension that corresponds to a body of a person having the human face;
determining whether to conduct a personal identification process that comprises, at least in part, identification of the human face, by determining, at least in part, whether at least one other physical dimension is sufficiently relevant to warrant conducting the personal identification process; and
in response to determining to conduct the personal identification process, conducting the personal identification process as a function, at least in part, of the human face, the at least one other physical dimension, and use of a Bayesian Belief Network.

8. The method of claim 7 wherein using a Bayesian Belief Network includes determining a probability of likelihood that:
the human face is that of a predetermined particular individual;
the at least one other physical dimension is that of the predetermined particular individual.

9. The method of claim 1 wherein detecting a human face includes using an image capture device to capture an image that includes the human face.

10. The method of claim 9 wherein using an image capture device includes responding to an opportunity detection monitor.

11. The method of claim 10 wherein the opportunity detection monitor includes at least one of detecting a weight and detecting motion.

12. The method of claim 10 wherein responding to an opportunity detection monitor includes detecting an opportunity in any of a plurality of areas where a candidate person may be present.

13. A method for automatically recognizing a human face, comprising:
automatically detecting a human face;
automatically detecting at least a height, using only a single image capture device, and a weight as corresponds to a body of a person having the human face;
determining whether to conduct a personal identification process that comprises, at least in part, identification of the human face, by determining, at least in part, whether at least one of the weight and the height are sufficiently relevant to warrant conducting the personal identification process; and
in response to determining to conduct the personal identification process, automatically conducting face recognition of the human face as a function, at least in part, of at least one of the height and the weight.

14. The method of claim 13 wherein automatically detecting a human face includes automatically detecting a human face in an image of a person.

15. The method of claim 13 wherein automatically conducting face recognition of the human face as a function, at least in part, of at least one of the height and the weight as corresponds to a body of a person having the human face includes allocating face recognition resources as a function, at least in part, of the height and the weight as corresponds to a body of a person having the human face.

16. The method of claim 13 wherein automatically detecting a human face includes automatically detecting a face in response to detecting another predetermined event.

17. The method of claim 16 wherein detecting another predetermined event includes at least one of detecting:
 weight; and
 motion within a predetermined area.

18. An apparatus comprising:
 a first physical dimension measurement device;
 a second physical dimension measurement device;
 an automatic face similarity measurement unit that is responsive to the first physical dimension measurement device and the second physical dimension measurement device;
 a face similarity measurement resource comprising, at least in part, a Bayesian Belief Network that is operably coupled to the first and second physical dimension measurement device and the automatic face similarity measurement unit;
 resource allocation means for automatically allocating the face similarity measurement resource as a function, at least in part, of body height and body weight for a given individual, wherein the resource allocation means comprises means for determining whether to conduct a personal identification process that comprises, at least in part, identification of a human face by determining, at least in part, whether at least one of the body weight and the body height are sufficiently relevant to warrant conducting the personal identification process.

* * * * *